(12) United States Patent
Yang

(10) Patent No.: US 12,528,129 B2
(45) Date of Patent: Jan. 20, 2026

(54) SCREW-CUTTING SHEAR

(71) Applicant: ZHEJIANG PRULDE ELECTRIC APPLIANCE CO., LTD., Zhejiang (CN)

(72) Inventor: Chenghao Yang, Jinhua (CN)

(73) Assignee: ZHEJIANG PRULDE ELECTRIC APPLIANCE CO., LTD., Jinhua (CN)

( * ) Notice: Subject to any disclaimer, the term of this patent is extended or adjusted under 35 U.S.C. 154(b) by 75 days.

(21) Appl. No.: 18/647,258

(22) Filed: Apr. 26, 2024

(65) Prior Publication Data

US 2024/0359243 A1    Oct. 31, 2024

(30) Foreign Application Priority Data

Apr. 26, 2023    (CN) .......................... 202310467281.0

(51) Int. Cl.
*B23D 29/02*    (2006.01)

(52) U.S. Cl.
CPC .................... *B23D 29/02* (2013.01)

(58) Field of Classification Search
CPC .... B23D 29/00; B23D 29/002; B23D 29/007; B23D 29/02; B23D 29/023; B23D 17/00; B23D 17/02; B23D 17/04
See application file for complete search history.

(56) References Cited

U.S. PATENT DOCUMENTS

| 10,092,966 B2 * | 10/2018 | Parks | B23D 21/00 |
| 2016/0101477 A1 | 4/2016 | Parks et al. | |

FOREIGN PATENT DOCUMENTS

| CN | 201236255 Y | 5/2009 |
| CN | 204491161 U | 7/2015 |
| CN | 114713897 A | 7/2022 |
| CN | 217749546 U | 11/2022 |
| CN | 115949719 A | 4/2023 |
| CN | 220178287 U | 12/2023 |
| JP | S59-219559 A | 12/1984 |
| JP | H06-297232 A | 10/1994 |
| JP | H06-297233 A | 10/1994 |
| JP | H08-174329 A | 7/1996 |
| JP | 2001-054660 A | 2/2001 |

(Continued)

OTHER PUBLICATIONS

Oct. 1, 2024 Search Report issued in European Patent Application No. 24173279.1.

(Continued)

*Primary Examiner* — Jennifer S Matthews
(74) *Attorney, Agent, or Firm* — Oliff PLC

(57) ABSTRACT

A screw-cutting shear includes a shear base and a shear lever which are hinged with each other; a rotary cam is arranged on the shear base, a track groove is formed on a sidewall of the cam, and a first drive piece fitted with an outer sidewall of the cam and a second drive piece fitted with the track groove are provided on the shear lever. The shear lever has a shearing position and an expanded position. The cam pushes the first drive piece to move along the outer sidewall of the cam, driving the shear lever to shift from the expanded position to the shearing position. The cam pulls the second drive piece to move along an inner wall of the track groove, driving the shear lever to shift from the shearing position to the expanded position.

10 Claims, 5 Drawing Sheets

(56) References Cited

FOREIGN PATENT DOCUMENTS

| | | | |
|---|---|---|---|
| JP | 2005-238431 A | | 9/2005 |
| JP | 2005238354 A | * | 9/2005 |
| JP | 2005238429 A | * | 9/2005 |
| JP | 2007-75299 A | | 3/2007 |

OTHER PUBLICATIONS

Apr. 1, 2025 Office Action issued in Japanese Patent Application No. 2024-071252.
Sep. 17, 2025 Office Action issued in Chinese Patent Application No. 202310467281.0.
Sep. 12, 2025 Search Report issued in Chinese Patent Application No. 202310467281.0.

* cited by examiner

SCREW-CUTTING SHEAR

FIELD

The subject matter described herein relates to a cutting technology, and more particularly relates to a screw-cutting shear.

BACKGROUND

A typical screw-cutting shear, which is a typical tool for cutting screws, comprises a shear base and a shear lever, the shear lever being driven by a cam to swing relative to the shear base; a stationary blade on the shear base interacts with a moving blade on the shear lever to shear off a screw. A spring is traditionally arranged for resetting purposes, i.e., separating the stationary blade from the moving blade by virtue of the elastic force provided by the spring, so as to be ready for a next shearing action. However, the spring is inefficient in performing resetting and also prone to be fatigued to cause resetting failure.

To improve resetting performance of the resetting structure, a pin is arranged on the shear base, and a track plate is arranged on the shear lever, with a track groove further formed on the track plate; the pin, driven by the cam, rotates along the track groove, whereby the shear lever is reset. The track groove also serves to control a ratio of resetting duration to shearing duration, enabling better control of the shearing action. However, due to arrangement of the track plate on the shear lever, the number of components of the overall screw-cutting shear increases, which increases assembly complexity and is also more demanding on strength of the track plate.

SUMMARY

A screw-cutting shear is provided, which can effectively overcome drawbacks of existing screw-cutting shears, which rely on a track plate to drive for resetting and thus have a complex structure and are highly demanding on strength of the track plate.

The disclosure is implemented by a technical solution stated infra:

A screw-cutting shear, comprising a shear base and a shear lever which are hinged with each other, a stationary blade being provided on the shear base, a moving blade interacting with the stationary blade to perform a shearing action being provided on the shear lever; a cam, which is rotatable, is arranged on the shear base, a track groove is formed on a sidewall of the cam, and a first drive piece fitted with an outer sidewall of the cam and a second drive piece fitted with the track groove are provided on the shear lever;

the shear lever has a shearing position and an expanded position; the cam pushes the first drive piece to move along the outer sidewall of the cam, driving the shear lever to shift from the expanded position to the shearing position; the cam pulls the second drive piece to move along an inner wall of the track groove, driving the shear lever to shift from the shearing position to the expanded position.

In some implementations, the second drive piece is a pin, one end of the pin being disposed on the shear lever, an opposite end thereof extending in the track groove. The pin may effectively reduce friction with the fitted track groove and thusly reduce resistance; in addition, the pin is not easily stuck at a corner of the track groove and provides a better smoothness when fitted with the track groove.

In some implementations, one end of the pin is disposed on a rotating plate, the rotating plate being rotatably connected to the shear lever. The rotating plate as innovatively provided allows for free adjustment of the pin position within a certain extent according to a trajectory of the track groove, thereby easing assembly.

In some implementations, one end of the pin is rotatably connected to the rotating plate, a rotating axis of the pin being parallel to a rotating axis of the rotating plate relative to the shear lever. The pin itself may rotate, which further reduces friction with the wall of the track groove; in addition, parallel arrangement of the rotating axis of the pin and the rotating axis of the rotating plate allows for the rotating plate to contribute a smoother position adjustment when the rotating plate is fitted with the pin.

In some implementations, the first drive piece is a roller rotationally attached on the shear lever; or, the first drive piece is a slider securely attached on the shear lever. The roller or slider may accurately feed back the stress applied by the cam to the shear lever, with reduced friction between the first drive piece and the cam.

In some implementations, the shear base and the shear lever are hinged via a shear shaft. Hinging of the shear base and the shear lever via the shear shaft can reduce friction when the shear lever rotates relative to the shear base and can also maintain stability of the shear lever swinging relative to the shear base.

In some implementations, the shear lever comprises a shearing end and a driven end, the moving blade being arranged at the shearing end, the first drive piece and the second drive piece being arranged at the driven end, the shearing end and the driven end being separately disposed at two sides of the shear shaft. Separate arrangement of the shearing end and the driven end at two sides of the shear shaft facilitates positioning the moving blade and the two drive pieces and allows for the drive pieces to obtain a larger force arm.

In some implementations, the shear base comprises a stationary end and a drive end, the stationary blade being secured at the stationary end, the cam being rotatably attached at the drive end, the stationary end and the drive end being separately disposed at two sides of the shear shaft. Separate arrangement of the stationary end and the drive end at two sides of the shear shaft can prevent interference between the moving blade and the cam.

In some implementations, an inner sidewall of the track groove is arranged parallel to the outer sidewall of the cam. This parallel arrangement facilitates manufacturing the cam and the track groove and also facilitates positioning the first drive piece and the second drive piece.

In some implementations, when the shear lever shifts from the expanded position to the shearing position, the second drive piece contacts with the inner wall of the track groove; and when the shear lever shifts from the shearing position to the expanded position, the first drive piece contacts with the outer sidewall of the cam. When the first drive piece and the second drive piece are inactive, they still contact with the cam at corresponding positions, preventing formation of clearance between the first drive piece and the cam and between the second drive piece and the cam. When the shear lever shifts from the expanded position to the shearing position, noise created between the first drive piece and the cam and between the second drive piece and the cam may be prevented.

The disclosure offers the following benefits compared with conventional technologies:

The track groove is formed on a sidewall of the cam and interacts with the second drive piece on the shear lever, which overcomes the structural complexity arising from separately providing a track plate in conventional technologies. By forming the track groove on the sidewall of the cam, the strength of the cam may contribute enough strength to the track groove; in addition, the drive force for reciprocal shifting of the shear lever between the expanded position and the shearing position is all contributed by the cam, which facilitates reciprocal shifting of the shear lever between the expanded position and the shearing position, effectively preventing jamming and meanwhile reducing the impact on the cam when the shear lever shifts between the expanded position and the shearing position, with reduced noise when the screw-cutting shear is operating. Since the cam per se has a high strength, formation of the track groove on the sidewall of the cam can also contribute a high strength to the track groove while ensuring enough strength of the cam, whereby the service life of the reciprocally operating screw-cutting shear is significantly extended.

Figure 1:
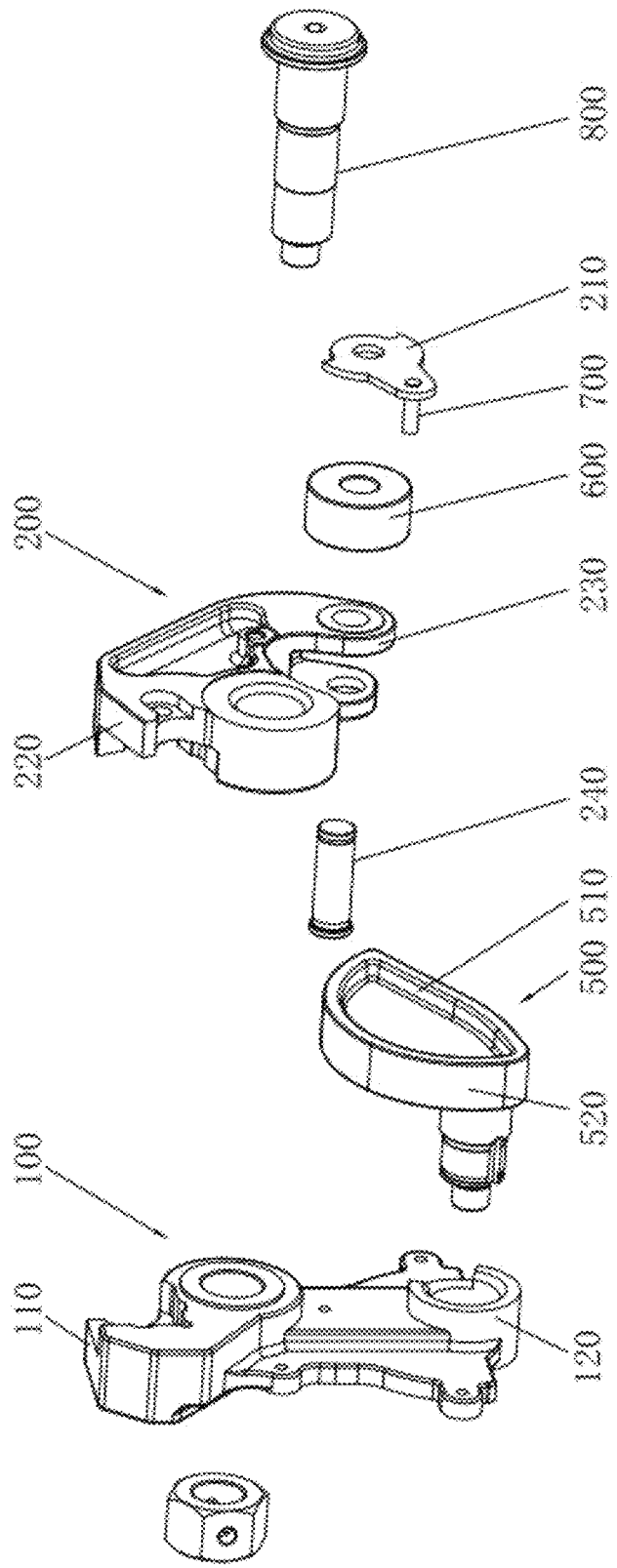
FIG. 1 is an exploded view of a screw-cutting shear according to the disclosure.

REFERENCE NUMERALS shear base 100, stationary end 110, drive end 120;
shear lever 200, rotating plate 210, shearing end 220, driven end 230, roller shaft 240;
stationary blade 300;
moving blade 400;
cam 500, track groove 510, outer sidewall 520;
first drive piece 600;
second drive piece 700;
shear shaft 800

DETAILED DESCRIPTION OF EMBODIMENTS

Hereinafter, the embodiments of the disclosure will be described in detail. Examples of the embodiments are illustrated in the accompanying drawings. The examples described with reference to the accompanying drawings are exemplary and intended to explain the disclosure, which should not be understood as limiting the disclosure.

In the description of the disclosure, it needs to be understood that the orientational or positional relationships indicated by the terms "center", "longitudinal", "transverse", "length", "width", "thickness", "upper", "lower", "front", "rear", "left", "right", "vertical", "horizontal", "top", "bottom", "inner" and "outer" refer to those orientational and positional relationships illustrated in the drawings, which are intended only for facilitating description of the disclosure and simplifying relevant depictions, but not for indicating or implying that the devices or elements compulsorily possess such specific orientations or are compulsorily configured and operated with the specific orientations; therefore, such terms should not be construed as limitations to the disclosure.

Besides, the terms "first" and "second" are only used for descriptive purposes, which shall not be construed as indicating or implying relative importance or implicitly indicating the number of a referred to technical feature. Therefore, the features limited by "first" and "second" may explicitly or implicitly include one or more of such features. In the description of the present disclosure, unless otherwise indicated, "plurality" indicates two or above.

In the disclosure, unless otherwise explicitly provided and limited, the terms such as "mount", "connect", "couple" and "fix" should be understood broadly, which, for example, may refer to a fixed connection, a detachable connection, or an integrated connection; they may refer to a mechanical connection or an electrical connection or mutual communication; they may refer to a direct connection or an indirect connection via an intermediate medium; they may also refer to communication between the insides of two elements or interaction between the two elements. To a person of normal skill in the art, specific meanings of the above terms in the disclosure may be construed based on specific situations.

FIGS. 1 to 5 illustrate an embodiment of a screw-cutting shear according to the disclosure. The screw-cutting shear comprises a shear base 100 and a shear lever 200 which are hinged with each other; a stationary blade 300 is arranged on the shear base 100, and a moving blade 400 interacting with the stationary blade 300 is arranged on the shear lever 200; a drive mechanism is arranged on the shear base 100 and the shear lever 200, the drive mechanism being configured to drive the shear lever 200 to swing relative to the shear base 100, whereby the stationary blade 300 and the moving blade 400 perform a screw-shearing action.

The drive mechanism comprises a rotary cam 500 arranged on the shear base 100; a track groove 510 is disposed on an end face of the cam 500 distant from the shear base 100; a first drive piece 600 interacting with an outer sidewall 520 of the cam 500 is arranged on the shear lever 200, and a second drive piece 700 interacting with the track groove 510 is further arranged on the shear lever 200. The shear lever 200 has a shearing position and an expanded position; the shearing position refers to a position at which the moving blade 400 and the stationary blade 300 interact to shear off a screw, and the expanded position refers to a position where the moving blade 400 is farthest from the stationary blade 300, i.e., the moving blade 400 and the stationary blade 300 are expanded sufficiently for inserting a to-be-sheared screw. As the cam 500 rotates, the outer sidewall 520 of the cam 500 contacts with the first drive piece 600 to push the first drive piece 600 to move along the outer sidewall 520 of the cam 500, whereby the shear lever 200 shifts from the expanded position to the shearing position; as the cam 500 continues rotating, the track groove 510 on the cam 500 pulls the second drive piece 700 to move along an inner sidewall of the track groove 510, whereby the shear lever 200 shifts from the shearing position to the expanded position; in this way, reciprocal swing of the shear lever 200 relative to the shear base 100 is realized. Since the track groove 510 is arranged on the cam 500 and the strength of the cam 500 suffices for forming the track groove 510 on a sidewall of the cam 500, the sidewall of the track groove 510 also has enough strength; in addition, arranging the track groove 510 on the cam 500 facilitates adjustment of positions of the first drive piece 600 and the second drive piece 700 upon assembly, ensuring that the shear lever 200 shifts more smoothly between the expanded position and the shearing position without jamming.

Furthermore, the second drive piece 700 may adopt a pin or a roller. Due to the size and corner radius of the track groove 510, the second drive piece 700 usually adopts a pin; as the pin has enough rigidity to transfer power with a low resistance when interacting with the track groove 510, it is adaptable to the smaller corner radius of the track groove 510. One end of the pin is disposed on the shear lever 200, and an opposite end thereof extends in the track groove 510 to interact with the inner sidewall of the track groove 510.

To facilitate adjustment of the positions of the second drive piece 700 and the track groove 510 and prevent interference when the first drive piece 600 interacts with the cam 500, a rotating plate 210 is disposed at a lower end of the shear lever 200; the rotating plate 210 and the shear lever 200 are rotatably connected; one end of the pin is disposed on the rotating plate 210, contributing a certain adaptive adjustment distance to the pin, which allows for adjustment of positions of the pin and the track groove 510.

Furthermore, the pin is securely attached on the rotating plate 210, so that rolling friction is contributed between the pin and the track groove 510, which reduces frictional resistance therebetween and can also reduce the noise created therebetween during operating. Moreover, the rotating axis of the pin is parallel to the rotating axis of the rotating plate 210 relative to the shear lever 200, so that no axial component force is created when the pin rolls along the inner sidewall of the track groove 510, ensuring connection stability between the rotating plate 210 and the shear lever 200.

The first drive piece 600 usually adopts a roller, the roller being rotatably attached on the shear lever 200 via a roller shaft 240; the roller rolls along the outer sidewall 520 of the cam 500, so that the shear lever 200 is pushed by the cam 500 to move from the expanded position to the shearing position. The roller form contributes a reduced vibration as well as a lower resistance when the first drive piece 600 moves along the outer sidewall 520 of the cam 500. Besides the roller form, the first drive piece 600 may also adopt a slider, which can also drive the cam 500 to push the shear lever 200 to move from the expanded position to the shearing position.

Figure 2:
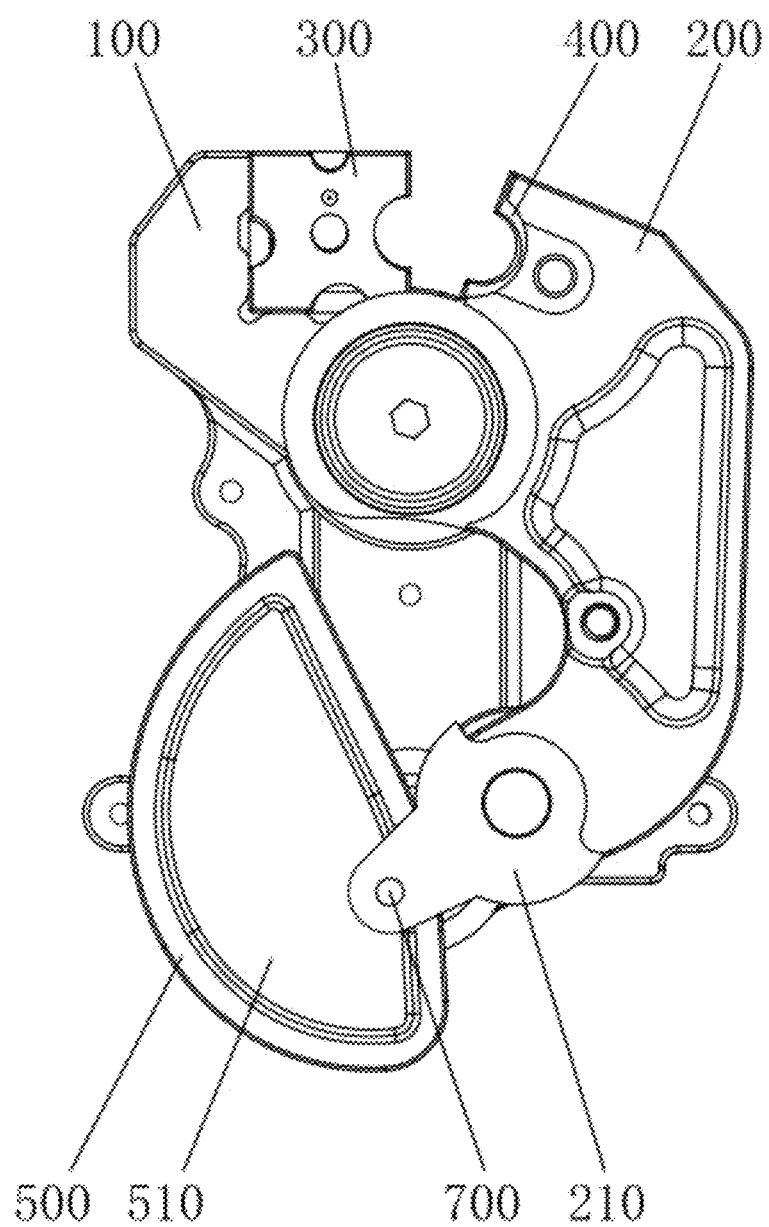
FIG. 2 is a structural schematic diagram of the screw-cutting shear at an expanded position according to the disclosure.

To facilitate a shearing action performed by the stationary blade 300 and the moving blade 400, the shear base 100 and the shear lever 200 are hinged into an X form, i.e., the shear base 100 and the shear lever 200 are hinged at their respective middle portions via a shear shaft 800. The shear lever 200 comprises a shearing end 220 and a driven end 230, the moving blade 400 being detachably secured at the shearing end 220; the first drive piece 600 and the second drive piece 700 are arranged at the driven end 230, i.e., the positions illustrated in FIG. 2; the shearing end 220 is disposed at an upper portion of the shear lever 200, and the driven end 230 is disposed at a lower portion of the shear lever 200. The shear base 100 comprises a stationary end 110 and a drive end 120, the stationary blade 300 being secured at the stationary end 110, the cam 500 being rotatably attached at the drive end 120; as also illustrated in FIG. 2, the stationary end 110 is disposed at the upper portion of the shear lever 200, and the drive end 120 is disposed at the lower portion of the shear lever 200. This arrangement facilitates interaction between the stationary blade 300 and the moving blade 400 to perform a shearing action, which also facilitates adjustment of the distances of the shearing end 220 and the driven end 230 on the shear lever 200 relative to the shear shaft 800, whereby a larger force arm is contributed to the driven end 230.

The inner sidewall of the track groove 510 and the outer sidewall 520 of the cam 500 are arranged in parallel, i.e., a shape enclosed by the inner sidewall of the track groove 510 is similar to a shape enclosed by the outer sidewall 520 of the cam 500, which may effectively reduce manufacturing and designing difficulty of the cam 500; besides, since the shape of the track groove 510 is similar to that of the outer sidewall 520 of the cam 500, adjustment of the first drive piece 600 and the second drive piece 700 is also eased.

Shifting the shear lever 200 from the expanded position to the shearing position relies on the cam 500 to push the shear lever 200 to move, whereby the first drive piece 600 moves along the outer sidewall 520 of the cam 500; at this point, the second drive piece 700 may contact with the track groove 510 or may not contact with the track groove 510. Preferably, at this point, the second drive piece 700 contacts with the inner wall of the track groove 510; as such, when the shear lever 200 shifts from the shearing position to the expanded position, there leaves no clearance between the second drive piece 700 and the track groove 510, and also no impact occurs; this facilitates extending the service life of the cam 500 and the second drive piece 700 and also reduces noise when the screw-cutting shear is operating. Of course, preferably, when the shear lever 200 shifts from the shearing position to the expanded position, the first drive piece 600 maintains contact with the outer sidewall 520 of the cam 500 to reduce impact occurring between the first drive piece 600 and the cam 500 when the shear lever 200 shifts from the expanded position to the shearing position.

Figure 3:
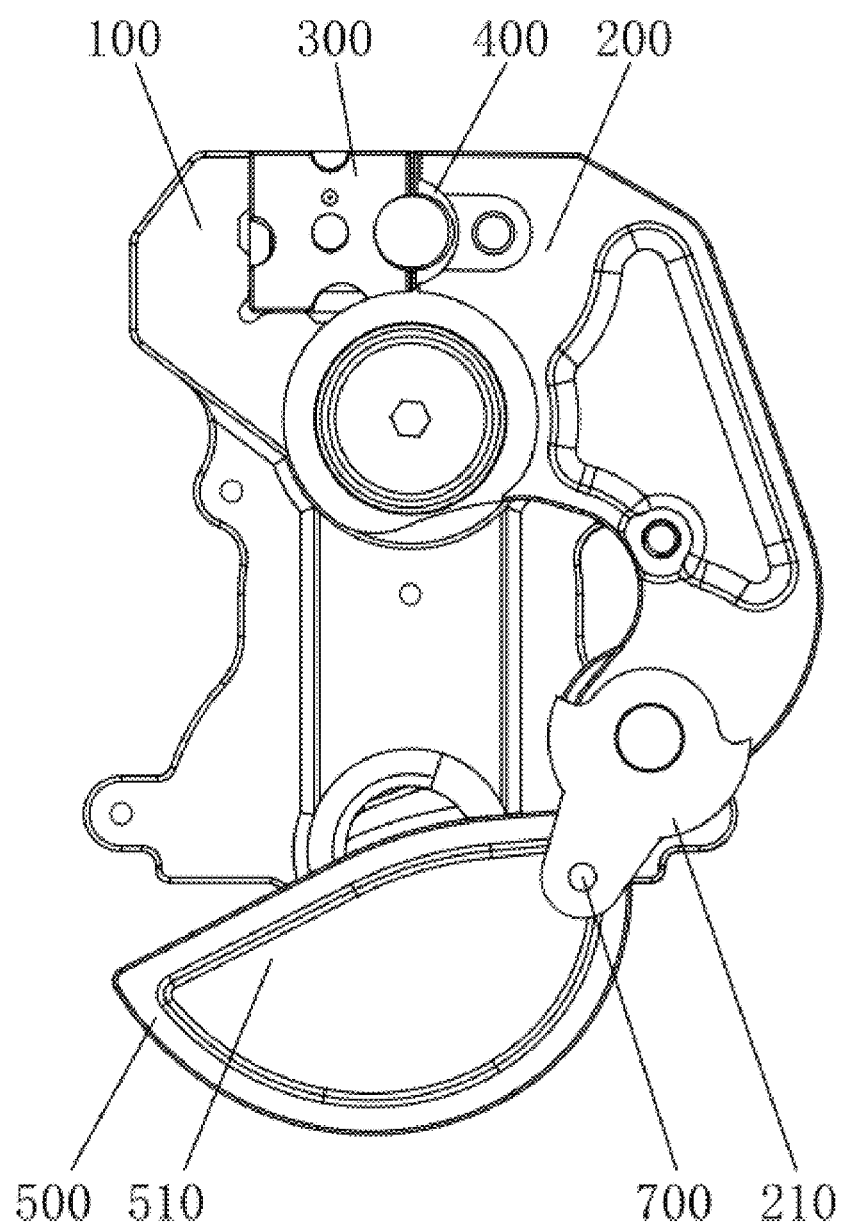
FIG. 3 is a structural schematic diagram of the screw-cutting shear when a moving blade just comes into contact with a to-be-sheared screw according to the disclosure.
Figure 4:
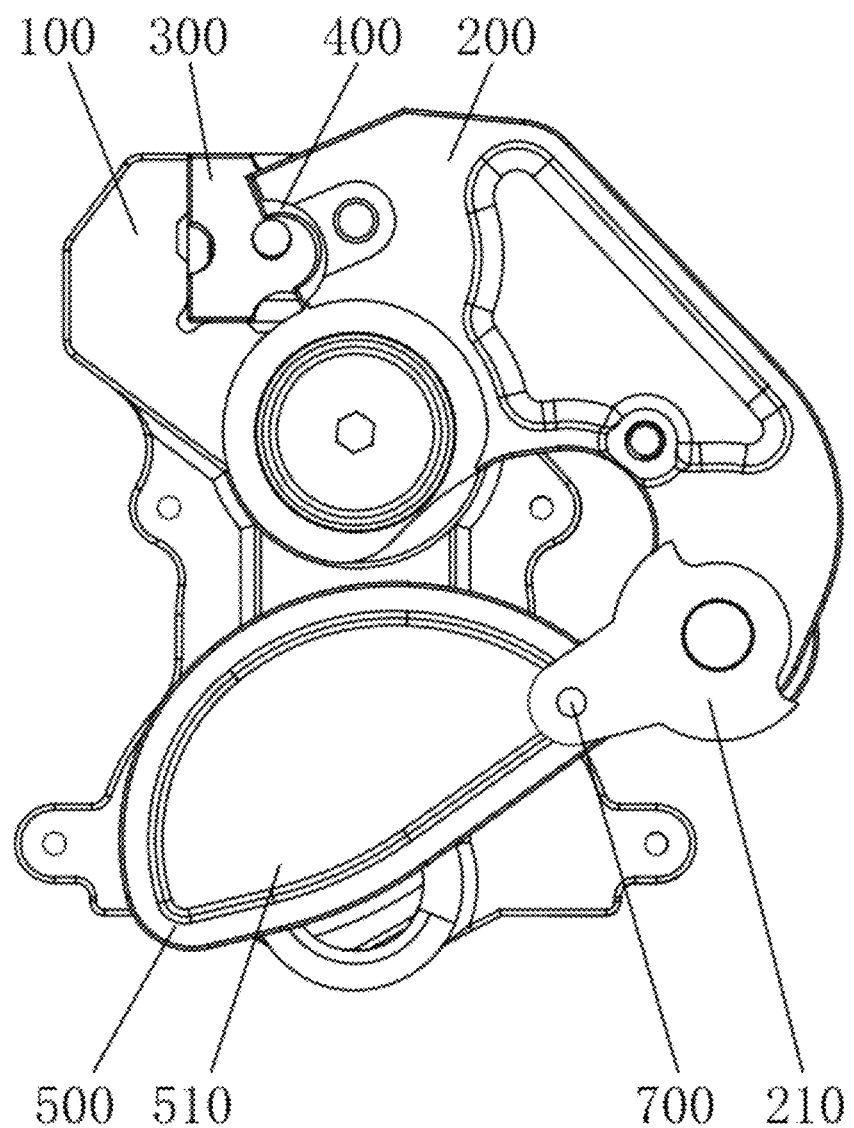
FIG. 4 is a structural schematic diagram of the screw-cutting shear at a shearing position according to the disclosure.
Figure 5:
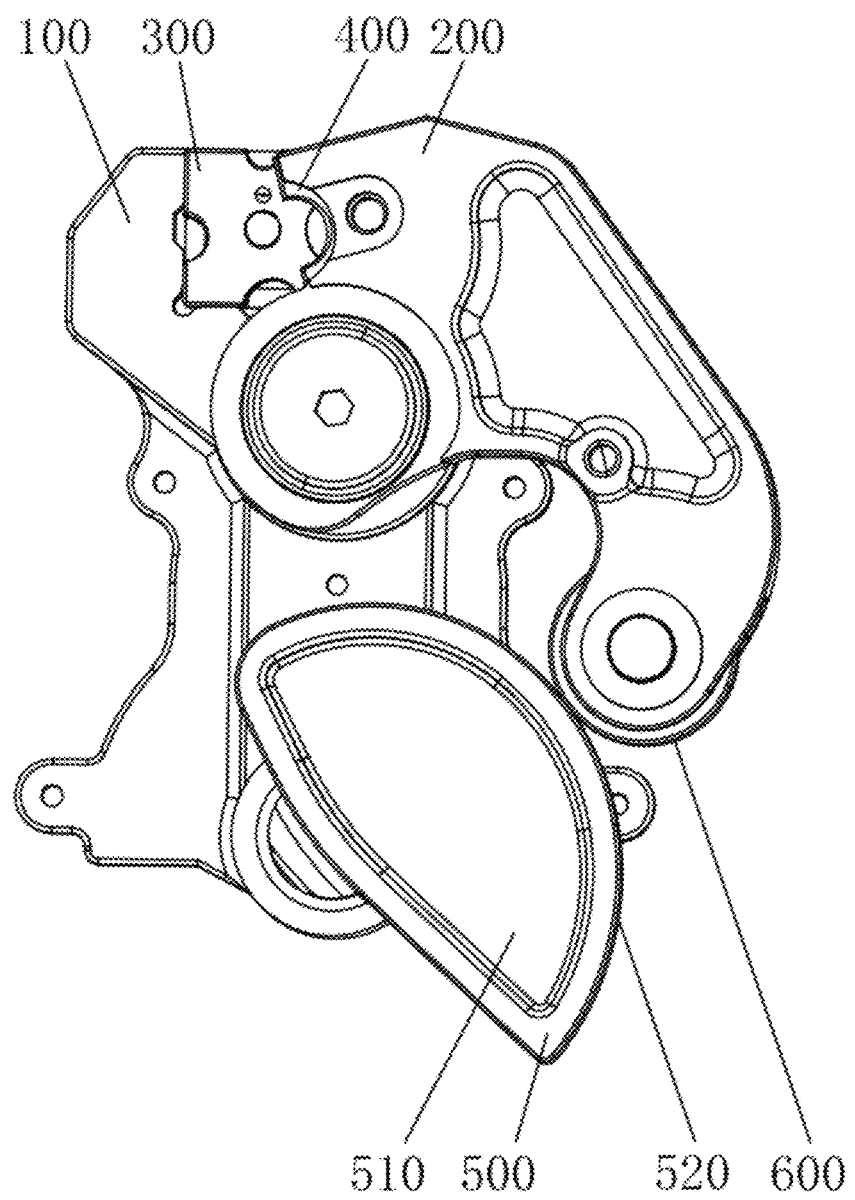
FIG. 5 is a structural schematic diagram of the screw-cutting shear in which a first drive piece interacts with a cam according to the disclosure.

During use, as illustrated in FIG. 2, the shear lever 200 is initially at the expanded position, with a spacing between the moving blade 400 and the stationary blade 300 being currently the maximum; a to-be-sheared screw is inserted between the moving blade 400 and the stationary blade 300; the cam 500 is activated by an electric motor to rotate; as the cam 500 rotates, the first drive piece 600 is pushed; the first drive piece 600 drives the shear lever 200 to swing about the shearing shaft 800 as the axis, whereby the shear lever 200 shifts from the expanded position to the shearing position; now, as illustrated in FIG. 3, the moving blade 400 on the shear lever 200 contacts with the screw, i.e., a ready-to-shear position; as the cam 500 continues rotating, as illustrated in FIG. 4, the shear lever 200 reaches the shearing position where the screw is sheared off. The cam 500 continues rotating till the shear lever 200 shifts from the shearing position to the expanded position; now, the track groove 510 and the second drive piece 700 interact; as the cam 500 rotates, the track groove 510 pulls the second drive piece 700, with the spacing between the moving blade 400 and the stationary blade 300 increasing gradually till the shear lever 200 reaches the expanded position. Then, the cam 500 rotates continuously, and the shear lever 200 repeats the above process to reciprocally shift between the shearing position and the expanded position. Since the track groove 510 is disposed on the cam 500, reciprocal shifting of the shear lever 200 between the expanded position and the shearing position is facilitated, which can effectively prevent jamming and also reduces the impact on the cam 500 when the shear lever 200 shifts between the expanded position and the shearing position, thereby reducing noise created when the screw-cutting shear is operating.

What have been described above are only embodiments of the disclosure; however, the protection scope of the disclosure is not limited thereto. A person skilled in the art should understand that the disclosure includes, but is not limited to, the contents described in the drawings and the embodiments. Any modifications without departing from the functions and structural principles of the disclosure will be included within the scope of the disclosure.

I claim:

1. A screw-cutting shear, comprising a shear base and a shear lever which are hinged with each other, a stationary blade being provided on the shear base, a moving blade being provided on the shear lever for interacting with the stationary blade for shearing, wherein a cam, which is rotatable, is arranged on the shear base, a track groove is formed on a sidewall of the cam, and a first drive piece fitted with an outer sidewall of the cam and a second drive piece fitted with the track groove are provided on the shear lever;
wherein the shear lever has a shearing position and an expanded position; the first drive piece moves along the outer sidewall of the cam, driving the shear lever to shift from the expanded position to the shearing position; the second drive piece moves along an inner wall of the track groove, driving the shear lever to shift from the shearing position to the expanded position.

2. The screw-cutting shear of claim 1, wherein the second drive piece is a pin, one end of the pin being disposed on the shear lever, an opposite end thereof extending in the track groove.

3. The screw-cutting shear of claim 2, wherein one end of the pin is disposed on a rotating plate, the rotating plate being rotatably connected to the shear lever.

4. The screw-cutting shear of claim 3, wherein one end of the pin is rotatably connected to the rotating plate, a rotating axis of the pin being parallel to a rotating axis of the rotating plate relative to the shear lever.

5. The screw-cutting shear of claim 1, wherein the first drive piece is a roller rotationally attached on the shear lever; or, the first drive piece is a slider securely attached on the shear lever.

6. The screw-cutting shear of claim 1, wherein the shear base and the shear lever are hinged via a shear shaft.

7. The screw-cutting shear of claim 6, wherein the shear lever comprises a shearing end and a driven end, the moving blade being arranged at the shearing end, the first drive piece and the second drive piece being arranged at the driven end, the shearing end and the driven end being separately disposed at two sides of the shear shaft.

8. The screw-cutting shear of claim 6, wherein the shear base comprises a stationary end and a drive end, the stationary blade being secured at the stationary end, the cam being rotatably attached at the drive end, the stationary end and the drive end being separately disposed at two sides of the shear shaft.

9. The screw-cutting shear of claim 1, wherein an inner sidewall of the track groove is arranged parallel to the outer sidewall of the cam.

10. The screw-cutting shear of claim 1, wherein when the shear lever shifts from the expanded position to the shearing position, the second drive piece contacts with the inner wall of the track groove; and when the shear lever shifts from the shearing position to the expanded position, the first drive piece contacts with the outer sidewall of the cam.

* * * * *